US011972713B2

(12) United States Patent
Paudel et al.

(10) Patent No.: US 11,972,713 B2
(45) Date of Patent: Apr. 30, 2024

(54) SYSTEMS AND METHODS FOR POINT DEFECT COMPENSATION

(71) Applicant: Apple Inc., Cupertino, CA (US)

(72) Inventors: Hari P. Paudel, Milpitas, CA (US); Chaohao Wang, Sunnyvale, CA (US); Hopil Bae, Palo Alto, CA (US); Mahdi Farrokh Baroughi, Santa Clara, CA (US); Wei Chen, Palo Alto, CA (US); Wei H. Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 17/714,804

(22) Filed: Apr. 6, 2022

(65) Prior Publication Data

US 2022/0358867 A1 Nov. 10, 2022

Related U.S. Application Data

(60) Provisional application No. 63/185,172, filed on May 6, 2021.

(51) Int. Cl.
*G09G 3/20* (2006.01)

(52) U.S. Cl.
CPC ....... *G09G 3/20* (2013.01); *G09G 2300/0439* (2013.01); *G09G 2320/0233* (2013.01); *G09G 2330/10* (2013.01)

(58) Field of Classification Search
CPC ...... G09G 3/20; G09G 3/3208; G09G 3/2003; G09G 3/2059; G09G 2300/0439; G09G 2320/0233; G09G 2320/0242; G09G 2320/0271; G09G 2330/10
See application file for complete search history.

(56) References Cited

U.S. PATENT DOCUMENTS

| | | | | |
|---|---|---|---|---|
| 10,354,577 B1 * | 7/2019 | Jepsen | ..................... | G09G 3/20 |
| 10,950,199 B1 * | 3/2021 | Buckley | ................. | H04N 25/68 |
| 2006/0066547 A1 * | 3/2006 | Nitta | .................... | G09G 3/3406<br>345/88 |
| 2006/0244476 A1 * | 11/2006 | Zhang | ...................... | G09G 3/20<br>348/E5.082 |
| 2006/0262147 A1 * | 11/2006 | Kimpe | ..................... | G09G 3/20<br>345/690 |
| 2008/0063256 A1 * | 3/2008 | Stellbrink | ............... | G06T 5/005<br>382/149 |

(Continued)

FOREIGN PATENT DOCUMENTS

| | | |
|---|---|---|
| WO | 2018164942 A1 | 9/2018 |
| WO | 2021071614 A1 | 4/2021 |
| WO | 2022039908 A1 | 2/2022 |

*Primary Examiner* — David Tung
(74) *Attorney, Agent, or Firm* — Fletcher Yoder P.C.

(57) ABSTRACT

An electronic device may display image content via an electronic display by controlling light emission from display pixels of the electronic display. A processor of the electronic device may receive image data destined for a defective display pixel (e.g., dim pixel, dead pixel). The processor may convert a gray level of the image data into a luminance domain to generate a target luminance that would have been emitted by the defective display pixel had the display pixel not been defective. After selecting a compensation mask, the processor may distribute the target luminance of the defective display pixels to nearby non-defective pixels of the electronic display to conceal the presence of the defective display pixel.

20 Claims, 8 Drawing Sheets

(56) References Cited

U.S. PATENT DOCUMENTS

| | | | | |
|---|---|---|---|---|
| 2008/0117231 | A1* | 5/2008 | Kimpe | G09G 3/20 345/629 |
| 2009/0051627 | A1* | 2/2009 | Ihata | G09G 5/022 345/76 |
| 2021/0110787 | A1* | 4/2021 | Buckley | G09G 3/32 |
| 2022/0058997 | A1* | 2/2022 | Buckley | G09G 3/2044 |

* cited by examiner

SYSTEMS AND METHODS FOR POINT DEFECT COMPENSATION

CROSS-REFERENCE TO RELATED APPLICATIONS

This application claims priority to U.S. Provisional Application No. 63/185,172, filed May 6, 2021, entitled "Systems and Methods for Point Defect Compensation," the disclosure of which is incorporated by reference in its entirety for all purposes.

SUMMARY

The present disclosure relates generally to display panels and, more particularly, to compensating for point defects in display panels.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Display panels on electronic displays may display images that present visual representations of information. Accordingly, numerous electronic systems—such as computers, mobile phones, portable media devices, tablets, televisions, virtual-reality headsets, and vehicle dashboards, among many others—often include or use display panels. In any case, a display panel may generally display an image by actively controlling light emission from its display pixels. By adjusting the brightness of different color components of the display pixels, a variety of different colors may be generated that collectively produce a corresponding image.

Different display pixels may emit different colors. For example, some of the display pixels may emit red light, some may emit green light, and some may emit blue light. Thus, the display pixels may be driven to emit light at different brightness levels to cause a user viewing the display to perceive an image formed from different colors of light. The display pixels may also correspond to hue and/or luminance levels of a color to be emitted and/or to alternative color combinations, such as combinations that use cyan (C), magenta (M), or the like. In some embodiments, a display pixel may include a group of display sub-pixels. However, as used herein, a display sub-pixel will refer to a display pixel. That is, a defective display sub-pixel refers to a defective display pixel.

In some cases, defective display pixels on the display panel could cause the programmed color to be incorrect. For example, a defective display pixel may be too bright or too dark in relation to the desired value. This may result in an undesirable image artifact. Thus, single point defects due to defective display pixels on display panels may cause image content to be displayed with pixels that are dimmer phan average, pixels that are fully dark, pixels brighter portions than average, and so forth. As such, visual errors resulting from point defects may disrupt the desired effect or experience for users when viewing image content on display panels. Replacing entire display panels due to point defects may be costly, time consuming, and inefficient for manufacturers of the display panels. Accordingly, compensating for point defects on display panels may be desirable to manufacturers of the display panels as well as to users viewing the image content on the display panels.

Accordingly, the present disclosure provides techniques for compensating for point defects (e.g., defective pixels) on a display panel. In some embodiments, the display panel may be part of an electronic device. In other embodiments, the display panel may be part of an external electronic display communicatively coupled to the electronic device. Processing circuitry (e.g., image processing circuitry, image compensation circuitry) of the electronic device may receive image data (e.g., pixel data) associated with displaying image content on the display panel. In other embodiments, the processing circuitry may generate the image data. The processing circuitry may distribute the image data, originally bound for a display pixel that has been identified to be defective, to other surrounding pixels according to a pattern that effectively conceals the presence of the defective display pixel. Defective display pixels may be identified during manufacture and any locations of the defective display pixels may be stored in memory accessible to the processing circuitry.

When the processing circuitry receives the image data associated with the image to be displayed from an image source, the image data may be defined as a gray level. As such, the processing circuitry may convert the gray level of the image data into a luminance domain. Converting the gray level of the image data into the luminance domain may help the processing circuitry identify an original luminance of a display pixel (e.g., a target luminance that would have been emitted by the display pixel had the display pixel not been defective). To compensate for such a point defect, the processing circuitry may distribute the target luminance of the defective display pixel to nearby non-defective display pixels of the display panel according to a compensation mask. Distributing the target luminance of the defective display pixel may involve the processing circuitry adding or subtracting a portion of the target luminance to the original amounts of light emitted by nearby non-defective display pixels of the display panel in accordance with the compensation mask. For example, a non-defective display pixel may emit an amount of light that is greater than its original luminance by a portion of the target luminance. Further, another non-defective display pixel may emit an amount of light that is lower than its original luminance by a portion of the target luminance. In effect, the electronic display emits or appears to emit the same amount of light that would have been emitted if the defective display pixel were not defective, while also concealing or partially concealing the defective display pixel.

The processing circuitry may select a compensation mask based on determining respective locations (e.g., positions) of the display pixels on the display panel, a pixel arrangement associated with the display panel, and the like. As used herein, the pixel arrangement may indicate a layout or shape of grid associated with the display panel. Non-limiting examples of pixel arrangements may include hexagonal grids, square grids, and rectangular grids.

In some embodiments, the processing circuitry may evaluate the image content to be displayed for angular features (e.g., honeycomb patterns, honeycomb pattern, a horizontal pattern, a vertical pattern, a 45° diagonal pattern, a −45° diagonal pattern). For example, the processing circuitry may identify that the image content is an image of mountain, where diagonal patterns are used to represent the mountain. If the pixel arrangement is a square grid, the processing circuitry may analyze the image content for angular features such as the diagonal patterns of the mountain in order to select a suitable compensation mask for correcting the point defect. For example, the processing circuitry may select a compensation mask that takes into account the diagonal features of the image content, the square grid of the display panel, and respective locations of the display pixels.

In other embodiments, the processing circuitry may select a compensation mask without evaluating the image content for angular features. For example, given the respective locations of display pixels remain constant and the pixel arrangement associated with the display panel is a hexagonal grid, the processing circuitry may select a universal compensation mask despite varying angular features of the image content. That is, for a display panel with pixels arranged as a hexagon, similar compensation masks may be applied for image content with diagonal patterns and image content with horizontal patterns. Compared to square grids, hexagonal grids may be less susceptible to noticeable visual errors despite changes in angular features. As such, the processing circuitry may not evaluate the image content for angular features if the pixel arrangement is a hexagonal grid, thereby saving processing power.

It can be appreciated that after compensating for point defects, the visual error associated with the defective display pixels on the display panel may be reduced. Because locations of pixels associated with the compensation mask may be different than a location of the defective pixel, total luminance of the image data after compensation of the defective pixel may be slightly different compared to the original luminance of the image data without the defective pixel. However, this slight change in luminance between the total luminance after compensation and the original luminance without the defective pixel may be less apparent or even imperceptible to the human eye. In alternative embodiments, the total luminance associated with the image data may not be changed despite compensating for point defects and distributing the target luminance of the defective display pixel to nearby non-defective display pixels.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
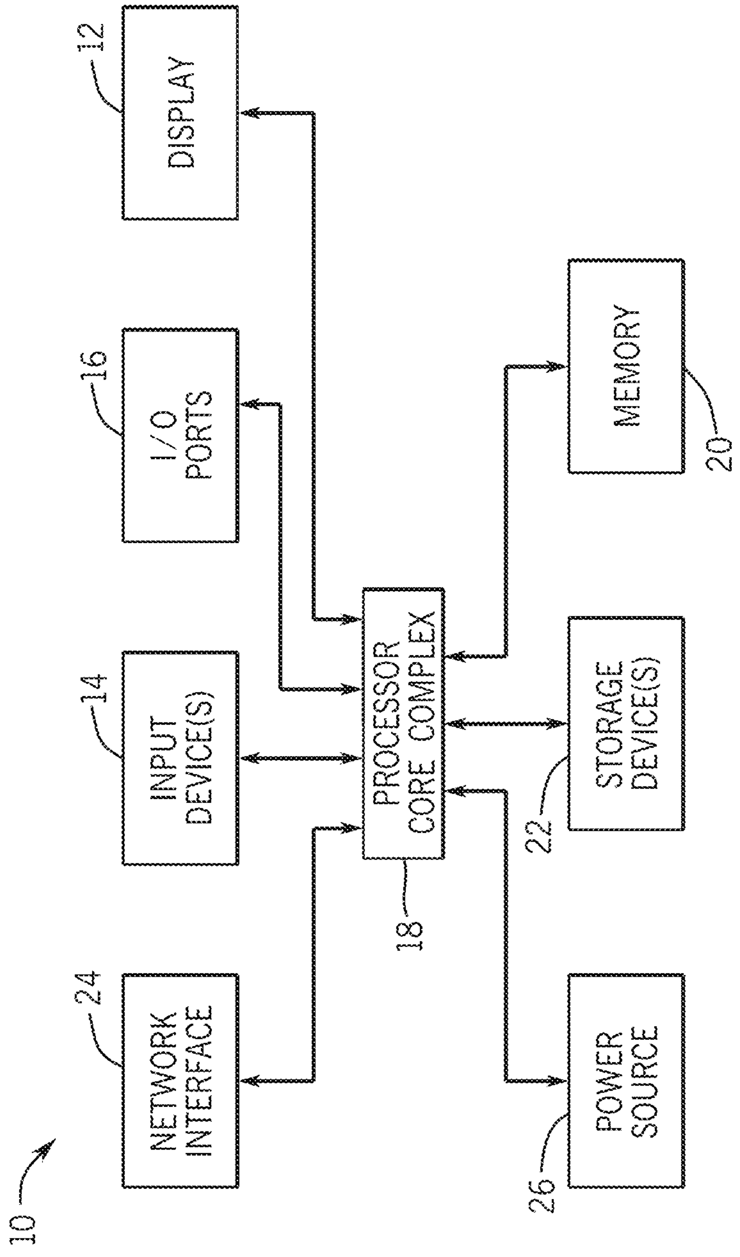
FIG. 1 is a block diagram of an electronic device with an electronic display, in accordance with an embodiment of the present disclosure.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive display pixels. The electronic display 12 may include any suitable circuitry to drive the self-emissive display pixels, including for example row driver or column drivers (e.g., display drivers). The self-emissive display pixels may include any suitable light emitting element, such as an LED, one example of which is an OLED. However, any other suitable type of display pixel, including non-self-emissive display pixels (e.g., liquid crystal as used in liquid crystal displays (LCDs), digital micromirror devices (DMD) used in DMD displays) may also be used.

The electronic device 10 includes the electronic display 12, one or more input devices 14, one or more input/output (I/O) ports 16, a processor core complex 18 having one or more processor(s) or processor cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

In some embodiments, the processor core complex 18 may include imaging processing circuitry to process image data based at least in part on compensation parameters (e.g., compensation mask) before processed pixel data is used to display corresponding image content on the electronic display 12. To compensate for defective display pixels (e.g., partially or fully dark display pixels), the image processing circuitry may process pixel data based on a compensation mask.

The processor core complex 18 is operably coupled with local memory 20 and the main memory storage device 22. Thus, the processor core complex 18 may execute instruction stored in local memory 20 or the main memory storage device 22 to perform operations, such as generating or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. In some embodiments, the display pixels may represent sub-pixels that each control a luminance of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image or pixel data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

Figure 2:
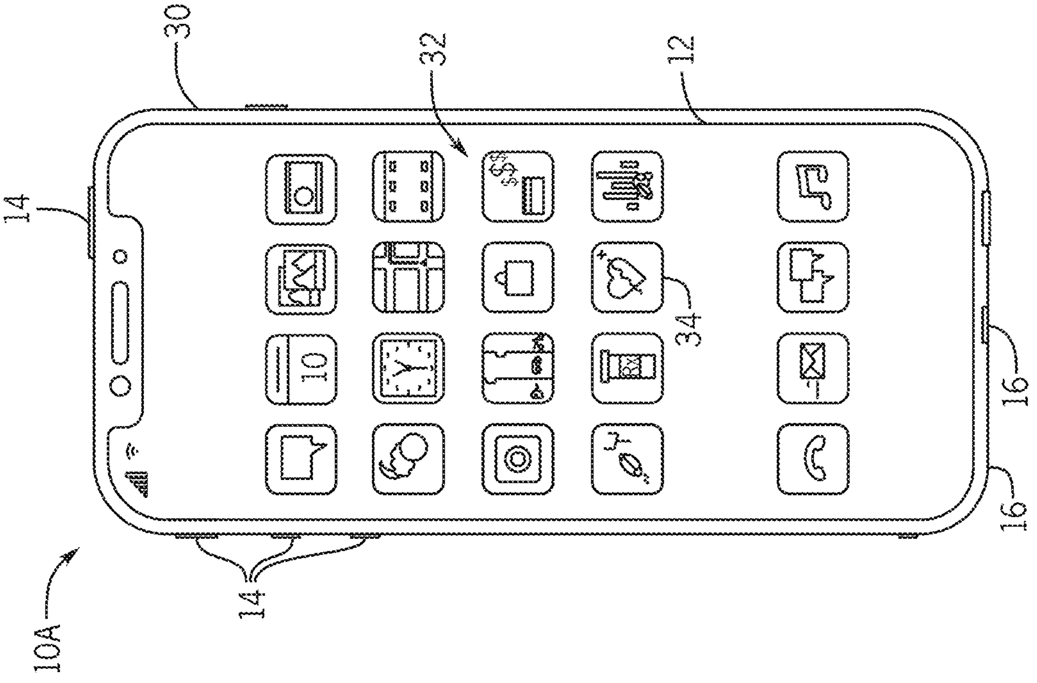
FIG. 2 is an example of the electronic device of FIG. 1, in accordance with an embodiment of the present disclosure.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
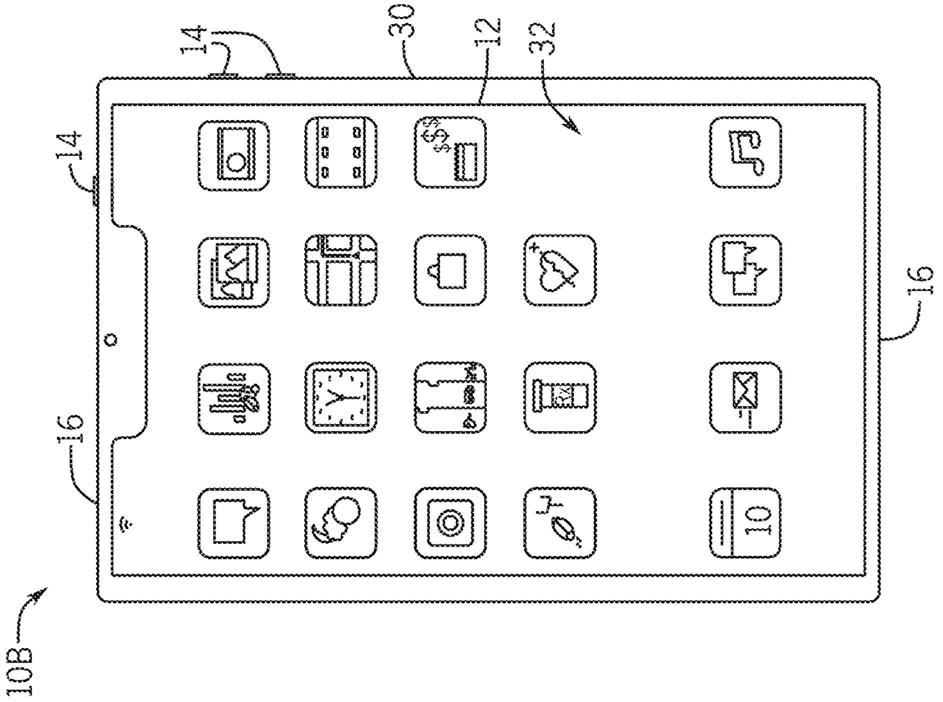
FIG. 3 is another example of the electronic device of FIG. 1, in accordance with an embodiment of the present disclosure.
Figure 4:
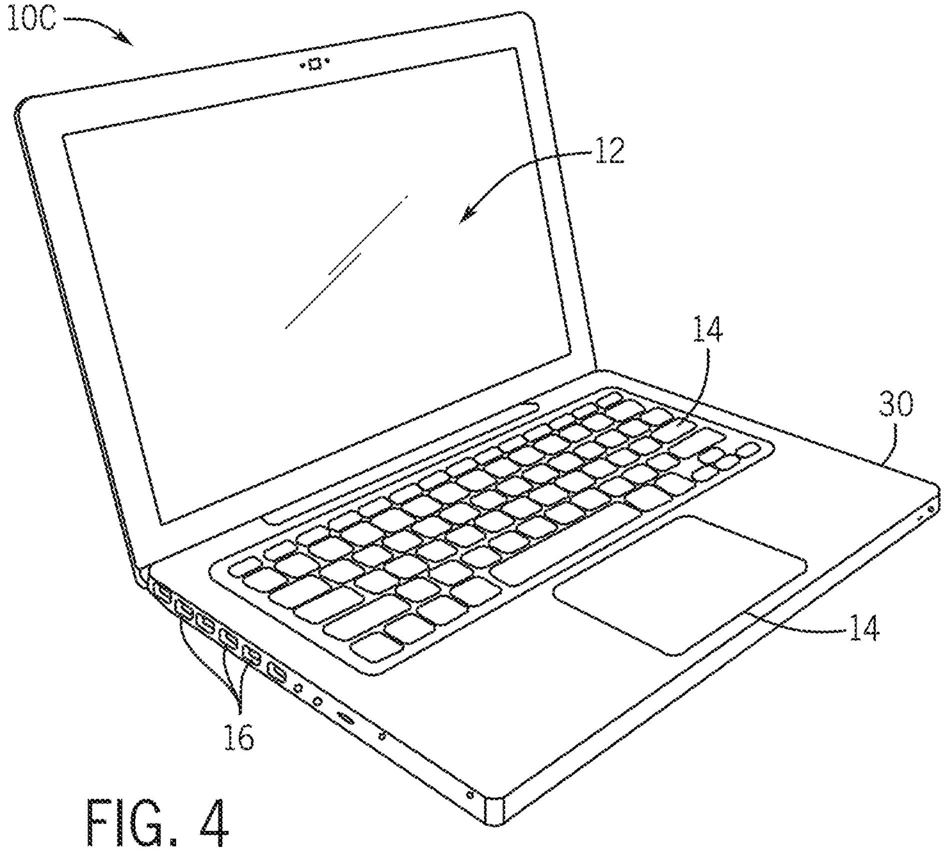
FIG. 4 is another example of the electronic device of FIG. 1, in accordance with an embodiment of the present disclosure.
Figure 5:
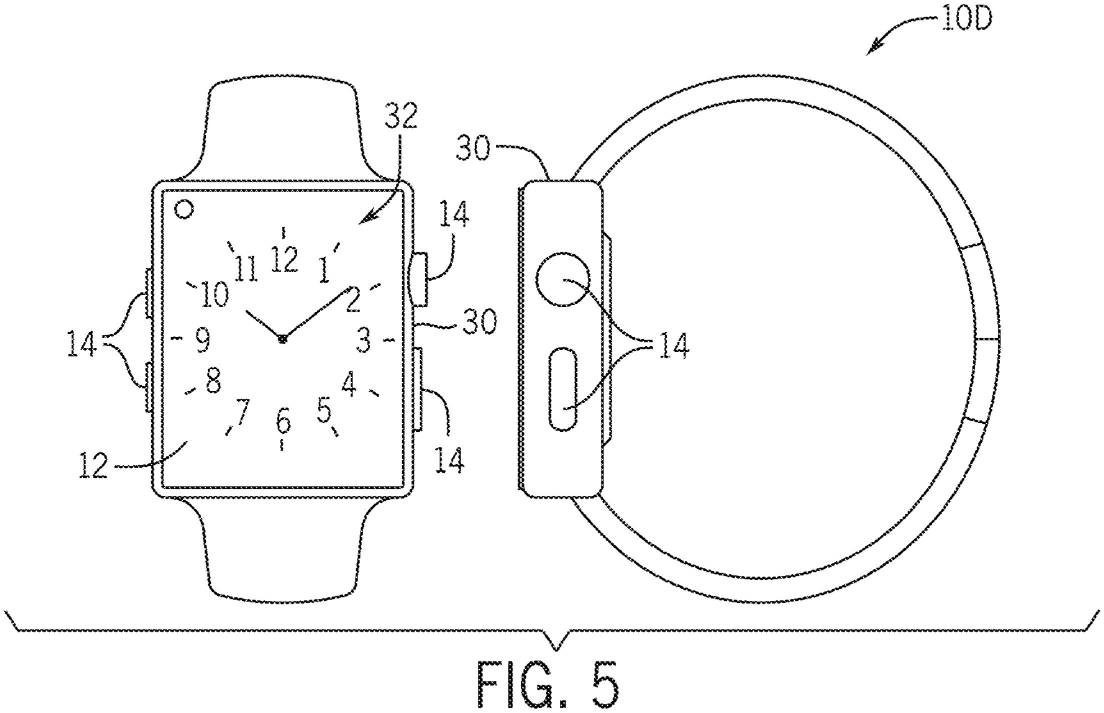
FIG. 5 is another example of the electronic device of FIG. 1, in accordance with an embodiment of the present disclosure.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
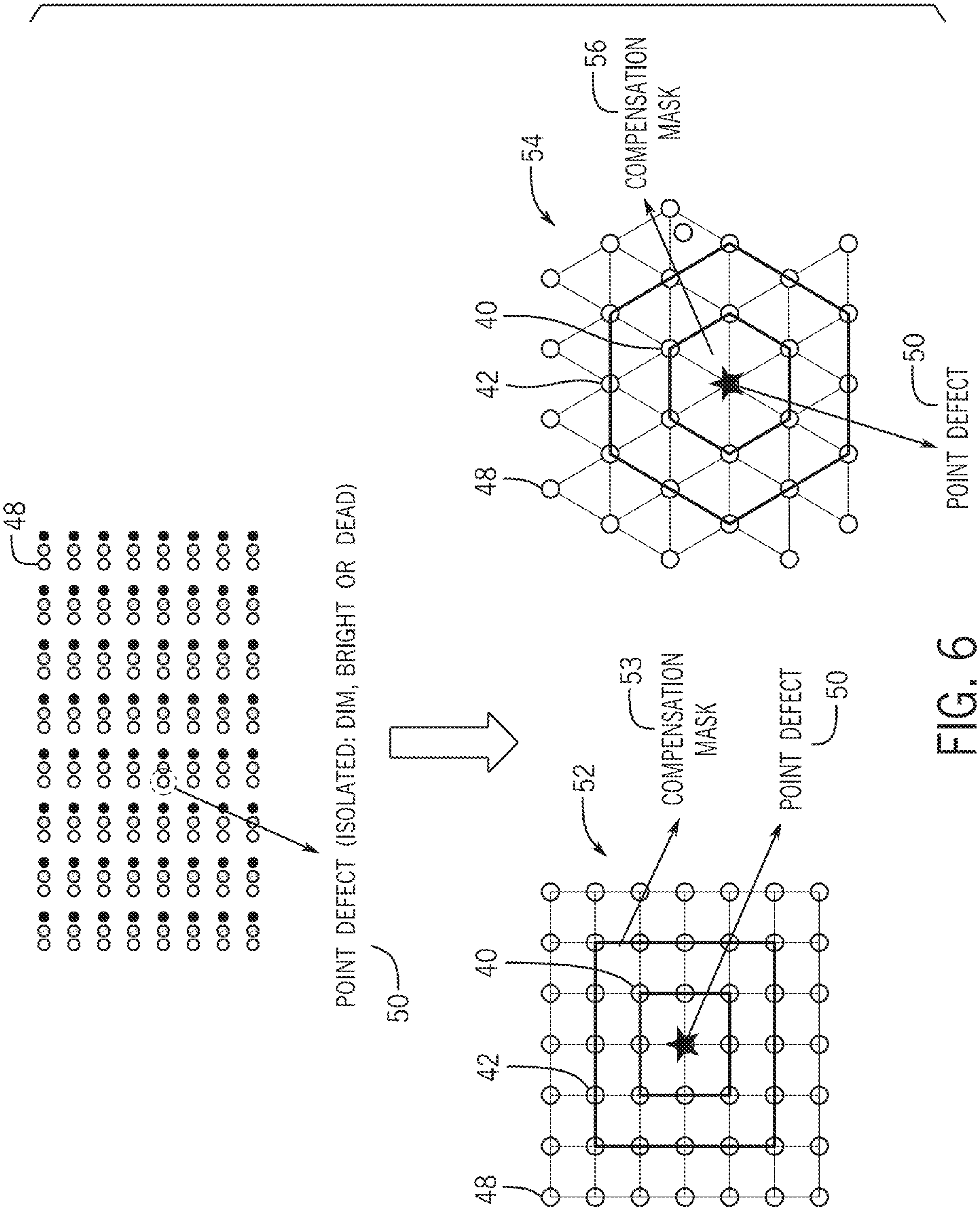
FIG. 6 is a schematic illustration of compensation masks for correcting point defects (e.g., defective display pixels) on the electronic display of FIG. 1 based on pixel arrangement (e.g., hexagonal grid, square grid), in accordance with an embodiment of the present disclosure.

With the foregoing in mind, FIG. 6 is a schematic illustration of various compensation masks to correct for point defects on the electronic display 12 based on pixel arrangement (e.g., square grid 52, hexagonal grid 54, rectangular grid). As mentioned above, the electronic display 12 may include a matrix of display pixels. Different display pixels (e.g., display sub-pixel) 48 may emit different colors (e.g., green light, blue light, red light). The electronic display 12 may display an image by actively controlling light emission from the display pixels 48 based on image data indicative of target luminance (e.g., brightness level or gray level) of the display pixels 48 in the image. When image processing circuitry, which is communicatively coupled to the electronic display 12, determines that image data may be destined for a defective display pixel 50, the image processing circuitry may select a compensation mask (e.g., compensation masks 53, 56) to correct for the defective display pixel 50. The image processing circuitry may select the compensation mask (e.g., compensation masks 53, 56) based on respective locations of the defective display pixel 50 and nearby non-defective display pixels 48 of the electronic display 12, the pixel arrangement of the electronic display 12, and the like. As used herein, a potential point defect on the electronic display 12 may result from image data destined for a defective display pixel 50 when the electronic display 12 is operating. A defective display pixel 50 may include a partially dead display pixel (e.g., a display pixel that is dimmer than its original luminance if the display pixel were not defective), a fully dead display pixel (e.g., a fully dark display pixel, a display pixel with no luminance), a bright display pixel (e.g., a display pixel that is brighter than its original luminance if the display pixel were not defective), and the like. Defective display pixels 50 may be defective due to process variation during manufacture or may become defective after manufacturing.

Since attempting to display image data using a defective display pixel 50 may result in image artifacts, the defective display pixel 50 may be deactivated (e.g., turned off, bypassed, programmed with gray level 0). The image data that would have been programmed into the defective display pixel may instead be distributed to nearby non-defective display pixels 48 in a way that at least partially conceals the defective display pixel 50. After applying the compensation mask (e.g., compensation masks 53, 56) to pixel data based on respective locations of the defective display pixel 50 and the non-defective display pixels 48, a particular pixel arrangement of the electronic display 12, or both, a defective display pixel 50 may appear to be less visible on the electronic display 12. For example, after compensating for a point defect, a dead display pixel 50 (e.g., fully dark display pixel) may appear as a brighter display pixel rather than a fully dark display pixel on the electronic display 12. As illustrated in FIG. 6, in some embodiments, the image processing circuitry may select the compensation masks (e.g., compensation masks 53 and 56) based on pixel arrangement of the electronic display 12. As used herein, the pixel arrangement may indicate a layout or shape of grid associated with the electronic display 12. Non-limiting examples of pixel arrangements may include square grids 52, hexagonal grids 54, and rectangular grids. As illustrated, the image processing circuitry may select a compensation mask 53 for a square grid 52 associated with the electronic display 12 and a different compensation mask 56 for a hexagonal grid 54 associated with the electronic display 12.

As used herein, if the electronic display 12 was arranged as the square grid 52, the compensation mask 53 may be used to conceal the defective display pixel 50 by offsetting nearby non-defective display pixels 48 (e.g., including non-defective pixels 40, 42) with a portion of a target luminance, which is a luminance emitted by the defective display pixel 50 had it not been defective. Offsetting involves adding or subtracting a portion of the target luminance to the nearby non-defective display pixels. In some embodiments, the target luminance may be distributed to nearby non-defective display pixels 48 according to a point spread function (e.g., 2D point spread function). The point spread function may involve the distribution of luminance to surrounding display pixels relative to the defective display pixel 50. For example, to compensate for a fully dark display pixel 50, the image processing circuitry may add a portion of the target luminance to the non-defective display pixels 40 immediately adjacent to the defective display pixel 50 with respect to the square grid 52. To compensate for the increase in luminance of the non-defective display pixels 40 immediately adjacent to the defective display pixel 50, the image processing circuitry may distribute a lower portion of the target luminance to non-defective display pixels 42 farther from the defective display pixel 50 compared to the non-defective display pixels 40 that are immediately adjacent to the defective display pixel 50. Similarly, if the electronic display 12 was arranged as the hexagonal grid 54, the compensation mask 56 may be used to conceal the defective display pixel 50 by offsetting nearby non-defective display pixels 48 (e.g., including non-defective pixels 40, 42) with a portion of the target luminance.

As illustrated by the square grid 52 of the electronic display 12, display pixels 40 that are immediately adjacent to the defective display pixel 50 may be distributed a portion of the target luminance that is greater than the portion of the target luminance distributed to other nearby display pixels 42. In other embodiments, nearby display pixels may receive similar portions of the target luminance despite relative distance from defective display pixel 50. For example, with the hexagonal grid 54 of the electronic display 12, display pixels 40 that are immediately adjacent to the defective display pixel 50 may be distributed a portion of the target luminance that is similar to the portion of the target luminance distributed to other nearby display pixels 42 due the hexagonal nature of the electronic display 12.

Figure 7:
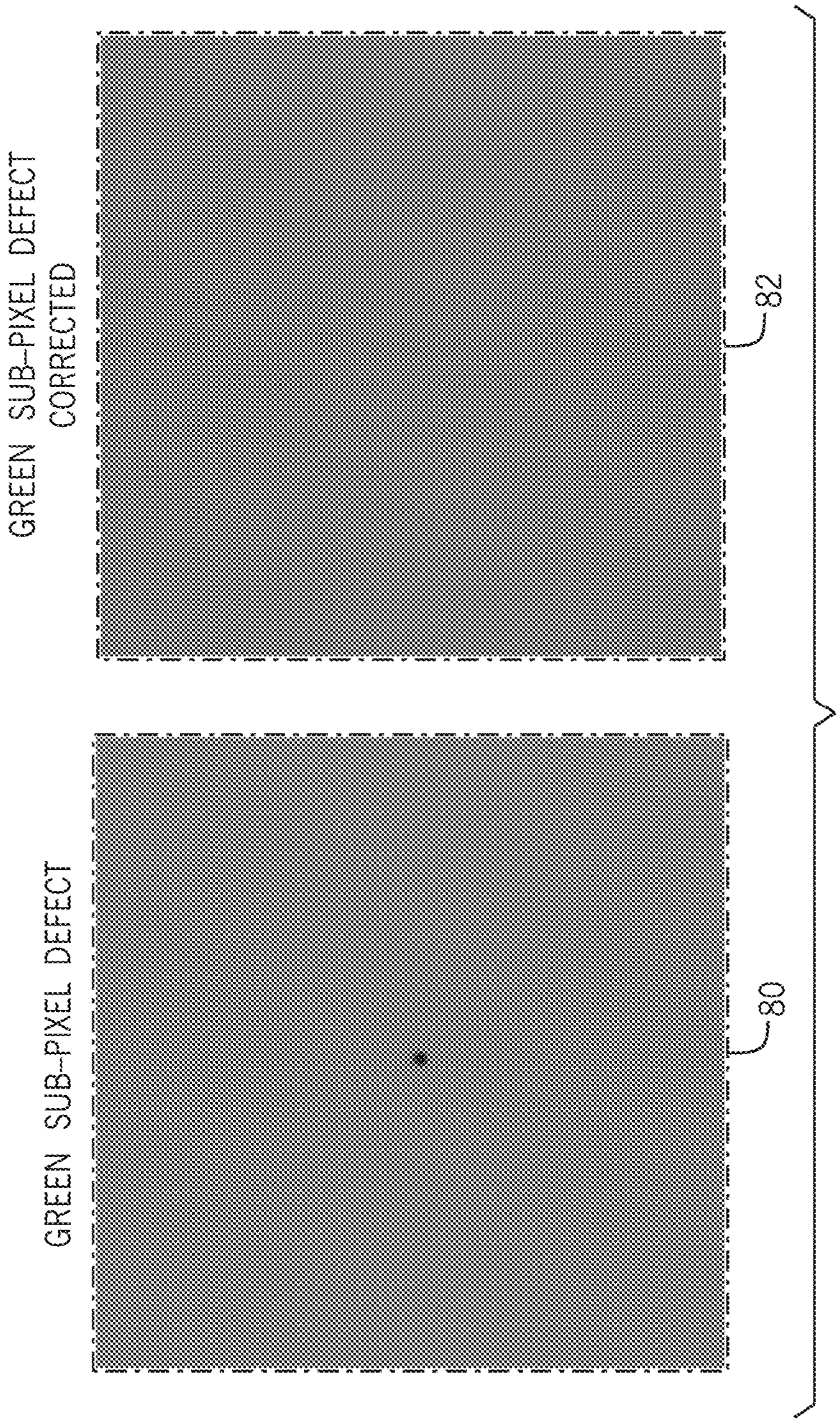
FIG. 7 is a schematic illustration depicting a defective display pixel that is less visible on the electronic display of FIG. 1 after point defect compensation, in accordance with an embodiment of the present disclosure.

As discussed above, compensating for a point defect reduces the visual error stemming from a defective display pixel on the electronic display 12. Accordingly, FIG. 7 is a schematic illustration depicting a defective display pixel that is less visible on the electronic display 12 after point defect compensation. Without point defect compensation, a defective green display pixel 80 appears as a dark spot or dead pixel when image content is displayed on the electronic display 12. However, after point defect compensation, the dark spot associated with the defective green display pixel 80 is fully invisible or partially invisible. That is, the image content on the electronic display 12 is displayed with a corrected green display pixel 82. The process for correcting display pixels will be described in greater detail below.

Figure 8:
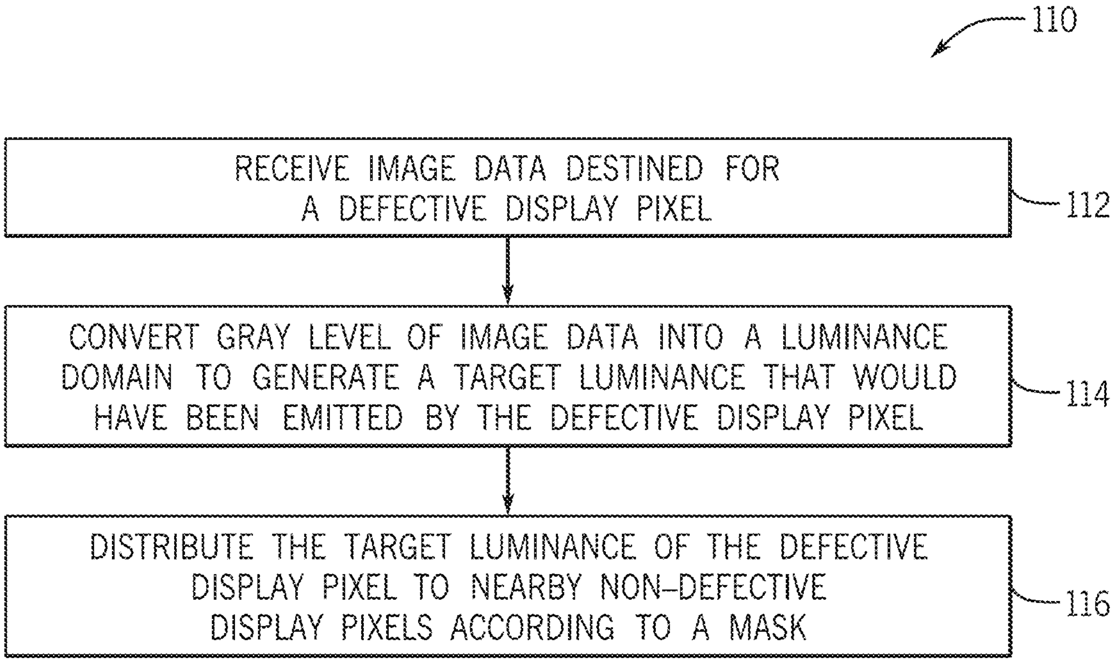
FIG. 8 is a flow diagram of a process for correcting point defects (e.g., defective display pixels) of FIG. 6, in accordance with an embodiment of the present disclosure.

With the preceding in mind, FIG. 8 is a flow diagram of the process 110 for correcting a defective display pixel or reducing visibility of a point defect on an electronic display, in accordance with an embodiment of the present disclosure. While the process 110 is described using steps in a specific sequence, it should be understood that the present disclosure contemplates that the described steps may be performed in different sequences than the sequence illustrated, and certain described steps may be skipped or not performed altogether. Defective display pixels may be defective due to process variation during manufacture or may become defective after manufacturing. As such, at block 112, processing circuitry (e.g., image processing circuitry, image compensation circuitry), receives image data indicative of a display pixel that may be defective when the electronic display is operating (e.g., when the image is displayed on the electronic display). As mentioned above, a defective display pixel may result in a display pixel dimmer than original luminance of the display pixel, a completely dark pixel, a display pixel brighter than the original luminance of the display pixel, and so forth when the image is displayed via the electronic display.

In some embodiments, when the processing circuitry receives the image data associated with an image from an image source, the image data may be in a gray level. As such, at block 114, the processing circuitry converts the gray level of the image data into a luminance domain. Converting the gray level of the image data into the luminance domain helps the processing circuitry identify the original luminance of the display pixel or a target luminance that would have been emitted by the display pixel had the display pixel not been defective.

To minimize the visibility of visual error resulting from the defective pixel when the image is displayed on the electronic display, at block 116, the processing circuitry distributes the target luminance of the defective display pixel to nearby non-defective display pixels within a distance from the defective display pixel according to a compensation mask. Distributing or offsetting the target luminance of the defective display pixel may involve the processing circuitry adding or subtracting a portion of the target luminance to the original amounts of light emitted by respective nearby non-defective display pixels of the electronic display. For example, a nearby non-defective display pixel may emit an amount of light that is greater than its original luminance by a portion of the target luminance. Further, another nearby non-defective display pixel may emit an amount of light that is lower than its original luminance by a portion of the target luminance Non-defective display pixels that are closer to the defective display pixel may receive a greater portion of the target luminance compared to non-defective display pixels that are farther from the defective display pixel. For example, non-defective pixels immediately adjacent to the defective display pixel may receive a higher portion of the target luminance to conceal the defective display pixel. That is, as distance from the defective display pixel increases, a magnitude of the target luminance added to the nearby display pixels or subtracted from nearby display pixels decreases.

Further, it can be appreciated that after compensating for point defects, the visibility or visual error associated with the defective display pixels on the electronic display may be reduced by 50%, 80%, 90%, 100%, and the like. For example, after compensating for a point defect, a dead display pixel (e.g., fully dark display pixel) may be concealed by the compensating light that is emitted by the nearby non-defective display pixels. In some embodiments, the processing circuitry may select a particular compensation mask for distributing the target luminance based on determining that the visual error after applying the compensation mask to the image data may be lower than a threshold visual error.

Figure 9:
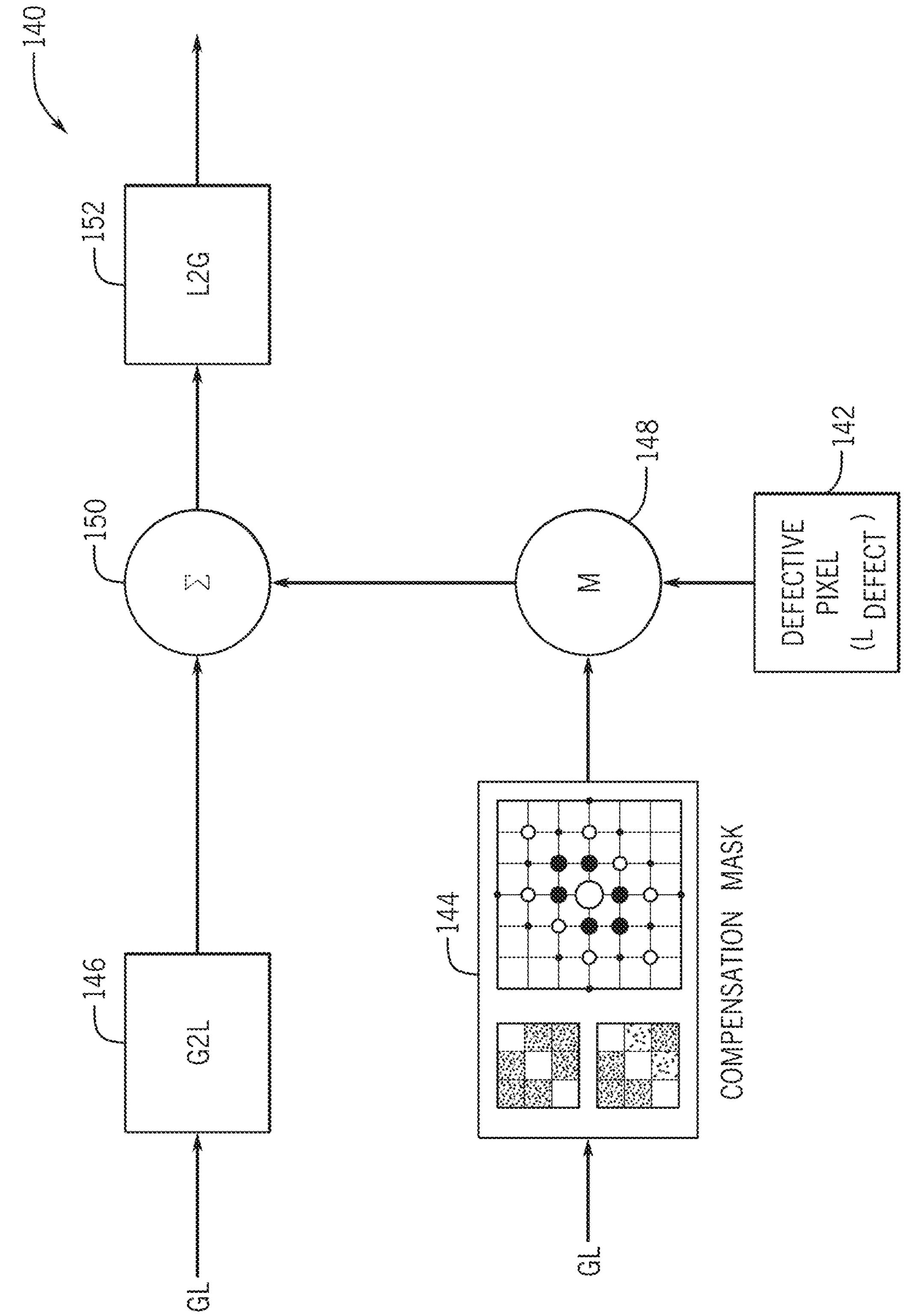
FIG. 9 is a block diagram associated with correcting point defects (e.g., defective display pixels) of FIG. 8 based on a compensation mask, in accordance with an embodiment of the present disclosure.

FIG. 9 is a block diagram associated with an image compensation system 140 for correcting point defects (e.g., defective display pixels) on an electronic display 12 using a compensation mask. As discussed above, a processor of the electronic display 12 may receive pixel data associated with displaying image content (e.g., images, videos) on the electronic display 12 in a gray level. The processing circuitry may receive image data indicative of a display pixel that is defective (block 142). A defective display pixel indicates that the present luminance of the display pixel does not match the original luminance of the display pixel had the display pixel not been defective. A defective display pixel 142 may be dimmer than average, brighter than average, or completely dark. Furthermore, the processing circuitry may receive or identify respective locations of the defective display pixel 142 and nearby non-defective display pixels of the electronic display 12. For example, a compensation mask 144 may be indicative of the respective locations as well as luminance of g the defective display sub-pixel 142 and the nearby non-defective display pixels of the electronic display 12.

In addition to respective locations and luminance of the display pixels, the compensation mask 144 may also be selected based on of a pixel arrangement (e.g., square grid, hexagonal grid) of the electronic display 12. Using the compensation mask, the processing circuitry may determine a target luminance 148 of the defective display pixel 142. The target luminance 148 is indicative of the original luminance of the defective display pixel 142 had it not been defective. In order to distribute a portion 150 of the target luminance 148 to nearby non-defective pixels surrounding the defective display pixel 142 to compensate for the point defect, the processing circuitry may convert a gray level of the image data into a luminance domain (block 146). Converting the gray level of the pixel data into the luminance domain may help the processing circuitry identify the target luminance 148 of the defective display pixel had the display pixel not been defective. Further, converting to the luminance domain may help the processing circuitry distribute the portion 150 of the target luminance 148 to other nearby non-defective pixels. In some embodiments, after the point defect is compensated, the processing circuitry may convert the luminance domain of a respective display pixel (e.g., a nearby non-defective display pixel) to the gray level (block 152).

Figure 10:
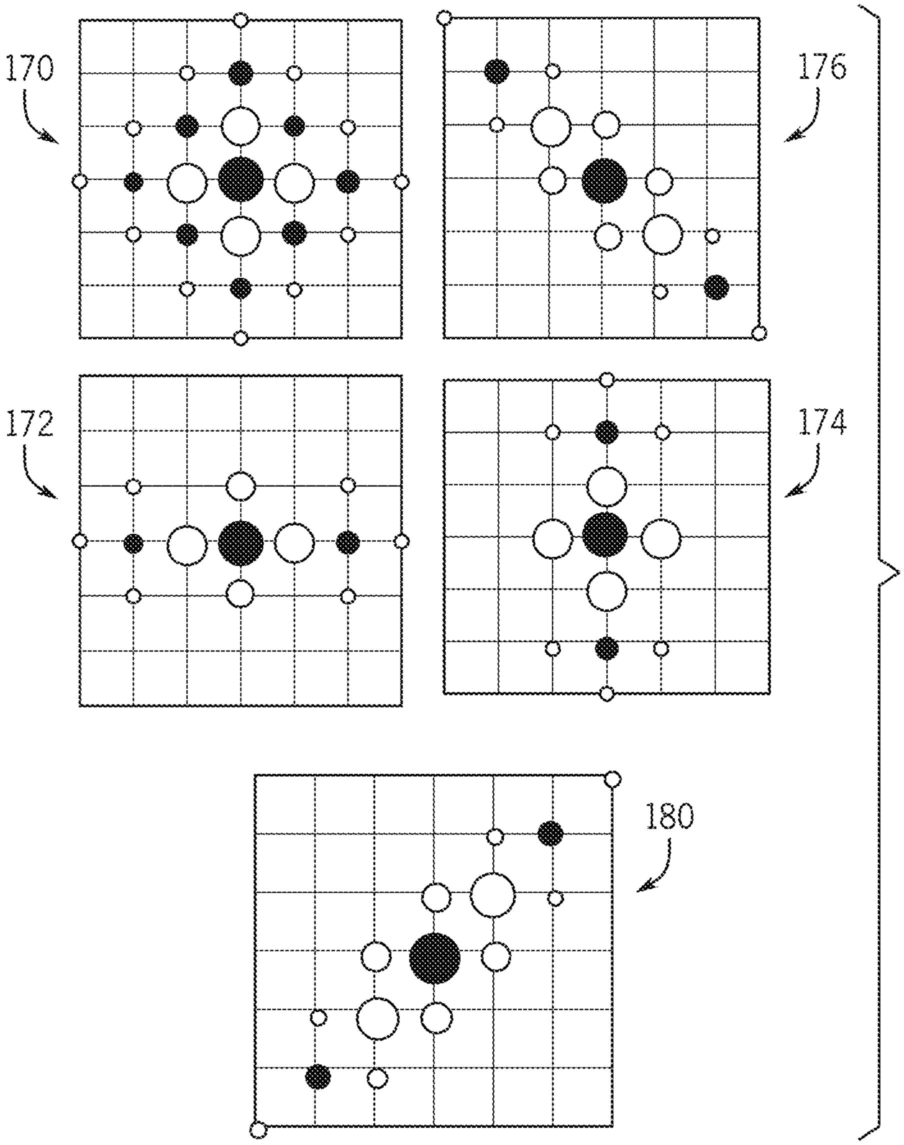
FIG. 10 is a schematic illustration depicting varying compensation masks of FIG. 9 based on angular features of image content, in accordance with an embodiment of the present disclosure.

With the preceding in mind, FIG. 10 is a schematic illustration depicting various compensation masks that a processor may select based on evaluating angular features of image content to be displayed on the electronic display 12. Non-limiting examples of angular features may include honeycomb patterns, honeycomb pattern, a horizontal pattern, a vertical pattern, a 45° diagonal pattern, a −45° diagonal pattern. In some embodiments, the processing circuitry may evaluate the image content for angular features when selecting a compensation mask. For example, as illustrated, a compensation mask 170 may be used for image content with a honeycomb pattern, a compensation mask 172 may be used for image content with a horizontal pattern, a compensation mask 174 may be used for image content with a vertical pattern, a compensation mask 176 may be used for image content with a −45° diagonal pattern, and a compensation mask 180 may be used for image content with a 45° diagonal pattern.

Figure 11:
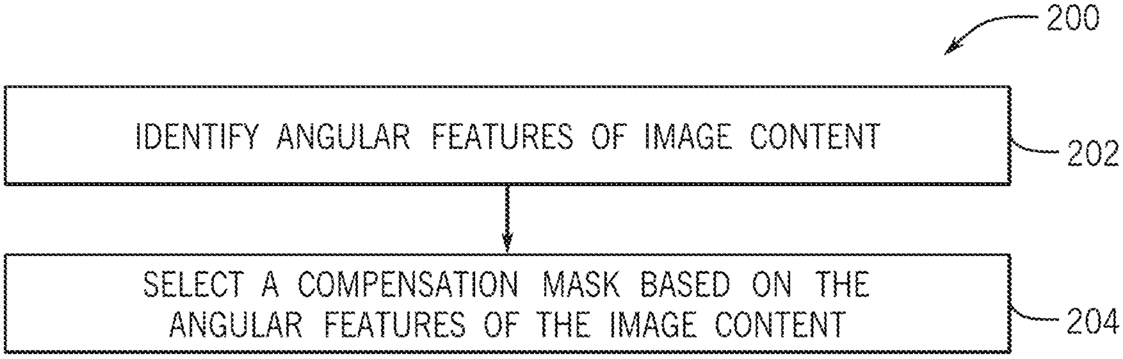
FIG. 11 is a flow diagram of a process for selecting a compensation mask based on the angular features of FIG. 10, in accordance with an embodiment of the present disclosure.

As discussed above, a processor may select a compensation mask based on a pixel arrangement of an electronic display and angular features of image content to be displayed. Accordingly, FIG. 11 is a flow diagram of the process 200 for selecting a compensation mask based on the angular features and the pixel arrangement, in accordance with an embodiment of the present disclosure. While the process 200 is described using steps in a specific sequence, it should be understood that the present disclosure contemplates that the described steps may be performed in different sequences than the sequence illustrated, and certain described steps may be skipped or not performed altogether.

At block 202, the processing circuitry may evaluate the image content for angular features. For example, the processing circuitry may identify that the image content is an image of mountain, where diagonal patterns are used to represent the mountain. At block 204, the processing circuitry may select a compensation mask that is suitable based on the angular features of the image content. For example, the processing circuitry may select a compensation mask suitable for honeycomb patterns if the image content includes honeycomb patterns.

In some embodiments, the processing circuitry may evaluate the image content for angular features based on the type of pixel arrangement. For example, if the pixel arrangement is a square grid, the processing circuitry may analyze the image content for angular features such as the diagonal patterns of the mountain in order to select a suitable compensation mask for correcting the point defect when the image of the mountain is displayed. For example, the processing circuitry may select a compensation mask that takes into account the diagonal features of the image content, the square grid of the display panel, and respective locations of the display pixels. Whereas if the image content includes horizontal pattern for display on the square grid of the display panel, the processing circuitry may select a different compensation mask that is suitable for the horizontal patterns. On a square grid, difference in angles between patterns (e.g., vertical patterns vs. horizontal patterns) may me more noticeable compared to other types of grids (e.g., hexagonal grid). As such, the processing circuitry may evaluate the type of patterns in the image content before selecting a compensation mask for a square grid.

In other embodiments, the processing circuitry may select a compensation mask without evaluating the image content for angular features. For example, if the pixel arrangement is a hexagonal grid and given the respective locations of display pixels remain constant, the processing circuitry may select a universal compensation mask despite varying angular features of the image content. That is, similar compensation masks may be applied for image content with diagonal patterns and image content with horizontal patterns on an electronic display with a hexagonal grid. Compared to square grids, hexagonal grids are prone to less noticeable visual errors despite changes in angular features. As such, in some embodiments, the processing circuitry may not evaluate the image content for angular features if the pixel arrangement is a hexagonal grid, thereby saving processing power.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display comprising a plurality of display pixels configured to display an image comprising image content; and image processing circuitry configured to:

receive image data corresponding to the image;

identify one or more angular features of the image content of the image;

select a compensation mask from a plurality of compensation masks based on the one or more angular features of the image content;

convert a gray level of the image data corresponding to a defective display pixel of the plurality of display pixels into a luminance domain to generate a target luminance that would have been emitted by the defective display pixel; and distribute the target luminance of the defective display pixel to a nearby plurality of non-defective display pixels of the electronic display within a distance of the defective display pixel according to the selected compensation mask.

2. The electronic device of claim 1, wherein distributing the target luminance comprises adding or subtracting a portion of the target luminance to the nearby plurality of non-defective display pixels.

3. The electronic device of claim 1, wherein the compensation mask is selected based on respective locations associated with the defective display pixel and the nearby plurality of non-defective display pixels of the electronic display.

4. The electronic device of claim 1, wherein the one or more angular features comprise a honeycomb pattern, a horizontal pattern, a vertical pattern, a 45° diagonal pattern, a −45° diagonal pattern or any combination thereof.

5. The electronic device of claim 1, wherein the image processing circuitry is configured to select the compensation mask based on a pixel arrangement associated with the electronic display.

6. The electronic device of claim 5, wherein the pixel arrangement associated with the electronic display comprises a hexagonal grid, a square grid, a rectangular grid, or any combination thereof.

7. The electronic device of claim 6, wherein when the pixel arrangement associated with the electronic display comprises the hexagonal grid, the image processing circuitry is configured to select the compensation mask without identifying the one or more angular features of the image content.

8. The electronic device of claim 1, wherein the electronic display comprises a self-emissive display.

9. The electronic device of claim 1, wherein the image processing circuitry is configured to convert the luminance domain of a nearby non-defective display pixel of the nearby plurality of non-defective display pixels to the gray level after distributing a portion of the target luminance to the nearby non-defective display pixel of the nearby plurality of non-defective display pixels.

10. A system, comprising:

a display panel comprising a plurality of display pixels;

processing circuitry configured to generate image data to be displayed on the display panel; and image compensation circuitry configured to:

receive an indication that a display pixel of the plurality of display pixels is a defective display pixel;

convert a gray level of the image data corresponding to the defective display pixel into a luminance domain to generate a target luminance that would have been emitted by the defective display pixel;

deactivate the defective display pixel such that the defective display pixel is fully dark;

determine a point spread function based on a physical pixel arrangement of the plurality of display pixels on the display panel; and distribute the target luminance of the defective display pixel to a nearby plurality of non-defective display pixels of the display panel within a distance of the defective display pixel according to the point spread function.

11. The system of claim 10, wherein the image compensation circuitry is configured to distribute the target luminance by adding or subtracting a portion of the target luminance to the nearby plurality of non-defective display pixels without changing a total luminance of the image data.

12. The system of claim 10, the image compensation circuitry is configured to distribute the target luminance according to the point spread function based on respective locations of the defective display pixel and the nearby plurality of non-defective display pixels of the display panel.

13. The system of claim 10, wherein the physical pixel arrangement associated with the display panel comprises a hexagonal grid or a square grid.

14. The system of claim 10, wherein the image compensation circuitry is configured to:

identify one or more features of image content based on the image data; and determine the point spread function based on the one or more features.

15. The system of claim 14, wherein the one or more features comprise a honeycomb pattern, a horizontal pattern, a vertical pattern, a 45° diagonal pattern, a −45° diagonal pattern, or any combination thereof.

16. The system of claim 10, wherein the image compensation circuitry is configured to distribute the target luminance of the defective display pixel to the nearby plurality of non-defective display pixels of the display panel such that a visibility error associated with the defective display pixel is within a threshold visibility error.

17. The system of claim 10, wherein the point spread function comprises a 2D point spread function.

18. A method, comprising:

receiving, via processing circuitry, image data indicative of an image to be displayed via a plurality of display pixels of an electronic display;

identifying, via the processing circuitry, one or more image content features of the image based on the image data;

selecting, via the processing circuitry, a compensation mask based on the one or more image content features, wherein the compensation mask is configured to distribute a target luminance to a plurality of non-defective display pixels; and compensating, via the processing circuitry, the image data based on the compensation mask.

19. The method of claim 18, wherein the electronic display comprises a light-emitting diode (LED) display, an organic light-emitting diode (OLED) display, a liquid crystal display (LCD), a digital micromirror device (DMD) display, or any combination thereof.

20. The method of claim 18, wherein the one or more image content features comprise a honeycomb pattern, a horizontal pattern, a vertical pattern, a 45° diagonal pattern, a −45° diagonal pattern, or any combination thereof.

* * * * *